Jan. 13, 1953      G. A. LYON      2,625,440
ORNAMENTAL WHEEL COVER
Original Filed Oct. 14, 1943
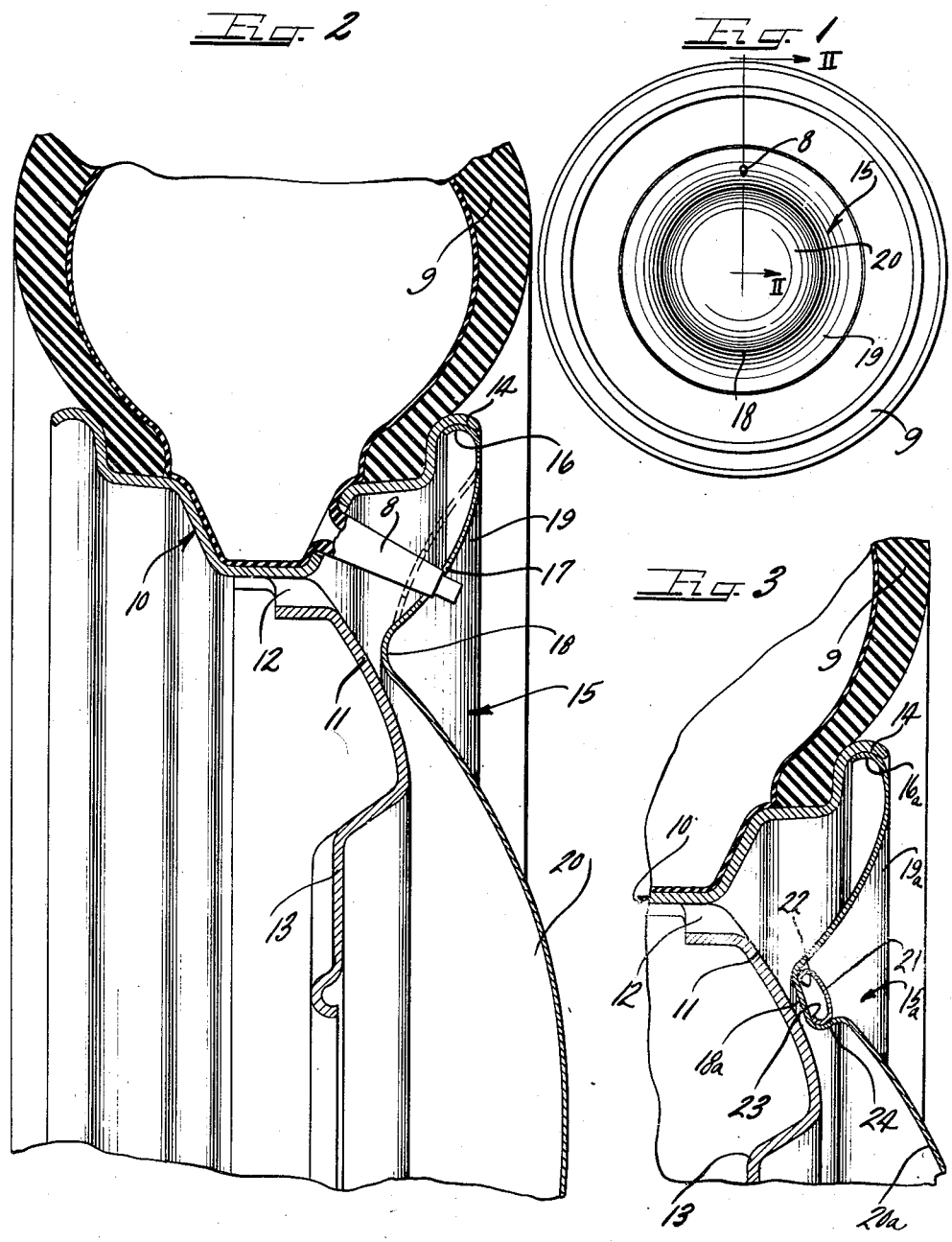
Inventor
GEORGE ALBERT LYON Patented Jan. 13, 1953

2,625,440

UNITED STATES PATENT OFFICE 2,625,440

ORNAMENTAL WHEEL COVER

George Albert Lyon, Detroit, Mich.

Continuation of application Serial No. 506,173, October 14, 1943. This application July 26, 1947, Serial No. 763,930. In Canada January 8, 1944

2 Claims. (Cl. 301—37)

This invention relates to a wheel structure and more particularly to an ornamental wheel cover adapted to be self-retained on a part of a wheel.

It is an important object of the present invention to provide for disposition over the outer side of a wheel structure, an improved cover assembly constructed from sheet synthetic plastic material or the like so as to have physical characteristics enabling it to be self-supporting and form retaining and yet resiliently, locally, temporarily flexible whereby it will immediately tend to spring back into initial configuration as distorting forces are relieved therefrom.

It is another important object of the present invention to provide for a cover assembly of the above character, an improved wheel retaining arrangement whereby the cover may be detachably secured to the wheel structure and yet securely supported thereon without the aid of auxiliary attachment members.

According to the general features of the invention there is provided in a wheel structure including a tire rim and a central load bearing part, the tire rim having a generally axially outwardly and slightly radially inwardly curved edge portion defining a radially inwardly opening groove of curved cross section, a circular wheel cover of a material which is resiliently flexible and adapted for sharp and substantial localized flexing but instantaneously snapping back to original form when released from flexure, the outer margin of the cover being turned generally axially and radially inwardly in the form of an annular flange of curved cross section and of an initial radius slightly greater than the radius of said groove, the flange being pressed into said groove and held by the groove curvature under stress to a complementary curvature and tending continuously to uncurl to its original radius whereby to maintain it in tight, rattle-proof engagement with the tire rim and place the cover under radially inward tension.

Other objects and features of this invention will more fully appear from the following detailed description, taken in connection with the accompanying drawings, which illustrate several embodiments thereof and in which:

Figure 1 is a side elevation of a wheel structure embodying features of this invention and showing my novel wheel cover applied to a wheel;

Figure 2 is an enlarged fragmentary cross-sectional view taken on the line II—II of Figure 1 looking in the direction indicated by the arrows and showing one form of the invention; and Figure 3 is a fragmentary sectional view similar to Figure 2 illustrating still another form of the invention wherein reinforcing means is provided at the junction of the cover portion.

As shown on the drawings:

The reference character 9 designates generally a conventional type of pneumatic tube tire mounted in the usual way on a multiple flange drop center tire rim 10 having the usual aperture through which a valve stem 8 projects from the tire.

Attached in the usual way or by any suitable means to the base of the tire rim 10 is a wheel body or spider 11 which at spaced intervals adjacent the rim has a plurality of air circulation openings 12, as is well known in the art. The central portion of the wheel spider body 11 is depressed into a bolt-on flange 13 which may be attached in any suitable manner as by means of wheel bolts or cap screws (not shown) to a support on an axle. As is well known in the art, such bolts or cap screws are removable for the purpose of removing the wheel from the axle.

At its outer extremity the tire rim 10 is provided with a generally axially outwardly and slightly radially inwardly curved edge portion 14 or terminal flange defining a radially inwardly opening groove of curved cross section.

The wheel thus far described is of a more or less standard construction. It is the aim of this invention to provide an ornamental and protective wheel cover for the outer side of the wheel. As best shown in Figure 2, the first form of cover is designated generally by the reference character 15 and is preferably made of a light gauge, highly flexible and resilient material such, for example, as a synthetic plastic. Excellent results may be obtained by making this wheel cover out of cellulose acetate. The lightness of the material is advantageous, since it reduces materially the extent of the unsprung weight on a vehicle.

The outer portion of the wheel cover 15 is turned rearwardly into a generally axially and radially inwardly curved flange or open bead 16 which is of a diameter such that it is adapted to tightly and resiliently nest inside the outermost curved flange of the wheel rim 10. I preferably make the cover diameter slightly greater than the diameter across the wheel inside the groove of the rim flange 14 and the turned edge flange 16 of a slightly greater radius than the radius of the inner surface of the groove of the tire rim terminal flange 14 so that the turned edge flange 16 must be resiliently stressed by flexing and curling slightly upon itself in order for it to pass the extremity of the rim flange 14 while being pressed into retaining cooperation with the wheel rim. After passing the rim flange edge the flange curl 16 automatically unflexes or expands and uncurls under resilient stress retainingly into the groove of the rim flange 14. It should be noted that this may be the sole means for holding the cover on the wheel and hence no additional fastening devices are required. The uniform radial stress of the flange curl 16 in the tire rim groove sets up a radially inward tension in the cover which enhances and assures a rattle-free snug cover retaining grip of the curl 16 in the groove. The flange curl 16 not only engages within the tire rim flange with snug radial tension but by reason of its uncurling expansion also with snug outward and rearward axial tension.

The wheel cover 15 may embrace two sections, namely, an outer annular ring section 19 and a central hub cap section 20. The two sections may be joined together by an integral depressed intermediate section 18 which extends rearwardly to a position in close proximity to the intermediate portion of the wheel body 11. In addition, the ring section 19 is provided with an aperture or opening 17 through which the end of the valve stem 8 is adapted to project. Moreover, by manually deflecting or depressing the wheel section 19 it is possible to move it to the dotted line position shown in Figure 2 without necessitating removal of the cover. By thus depressing the material of the ring section 19 about the opening 17 it is possible to cause the valve stem to extend further out of the cover through the opening 17 and thus be more accessible for the introduction of air therein.

The curvature and the width of the trim ring section 19 is such that it appears to constitute a continuation of the curved outer side wall of the tire. That is to say, its outer edge terminates in close proximity to the tire and its inner edge extends deeply into the wheel to a position adjacent the wheel body 11. By coloring this section in a light color, such as white, it is possible to cause this section or ring to appear to be a part of the side wall of the tire, such as a white side wall portion. With such an arrangement it is feasible to dispense with the use of white side wall tires. Moreover it contributes to giving the tire a massive appearance in which the tire appears to extend clear down to the central hub cap portion 20 at the junction 18.

The material used in the different forms of my invention, and particularly in the ring section, is such that the cover is form-sustaining and yet may be manually deflectable without permanent deformation. In other words, after a deflection of the same, the natural inherent resiliency of the material causes the deflected portion to spring back to its initial shape.

In Figure 3 I have illustrated a modification of the invention wherein the same numerals are applied to the parts of the wheel corresponding to those of the structure described in Figure 2. The cover, however, is slightly different from the cover 15. I have designated this modified form of cover by the reference numeral 15a. This cover, like the first form, has an outer ring section 19a and a central hub cap section 20a joined together at an indented junction 18a. In addition, the outer edge of the ring portion 19a is turned rearwardly into an open flange curl or bead 16a which serves to retain the cover on the tire rim in the same manner as the cover 15 is retained.

The principal difference between this form of the invention and the first described one resides in the fact that at the junction 18a of the two cover portions there is provided a reinforcing metallic bead 21 which has underturned edges 22 and 23 embracing the two portions of the cover. The hub cap portion 20a has an undercut shoulder 24 adjacent the indented section 18a into which the edge 23 of the metallic bead is adapted to be sprung for the purpose of holding the bead on the cover. The bead may be of a continuous construction or, if greater resiliency is desired, it may be made in the form of a split ring.

By using a highly lustrous bead it is possible to obtain a color contrast in the cover that is very pleasing to the eye. For example, the ring section 19a may have a white appearance, the intermediate bead 21 may have a lustrous finish, and the central hub cap portion 20a may have a darker color. Many different color combinations are possible with this construction.

It is to be noted that in all forms of the invention the intermediate indented section serves to reinforce the cover inwardly of the outer side of the wheel. In addition, in all forms of the invention, the cover is applied to the wheel by pressing it axially against the wheel flange until its turned edge is snapped into nested tight resilient cooperation with the surface of the outermost flange of the tire rim.

In all forms of the invention the cover may easily be removed by inserting a pry-off tool between the curved bead and the outermost flange of the tire rim. By slightly twisting the pry-off tool (which may be a screw-driver), it is possible to forcibly eject the cover from its retained engagement with the wheel. No other retaining means is necessary other than the stressed resilient cooperation between the curved outer bead of the cover and the flange of the tire rim.

This application is a continuation of and replaces my copending application, Serial No. 506,173, filed October 14, 1943, and now abandoned.

I claim as my invention:

1. In a unitary circular wheel cover, integral outer ring and central hub cap portions with their junction indented to provide an outwardly opening annular groove, said cover having at least said ring portion made of manually flexible form-retaining synthetic plastic material, said ring portion having wheel-engageable cover retaining means on its outer margin, said groove having an ornamental reinforcing narrow bead resiliently snapped thereinto for retaining engagement with said cover portions.

2. In a unitary circular wheel cover, integral outer ring and central hub cap portions with their junction indented to provide an outwardly opening annular groove, said cover having at least said ring portion made of manually flexible form-retaining synthetic plastic material, said ring portion having wheel-engageable cover retaining means on its outer margin, said groove having an ornamental reinforcing narrow bead resiliently snapped thereinto for retaining engagement with said cover portions and said hub cap portion having an undercut recess opening into said groove and in which the radially inner side of the bead is seated.

GEORGE ALBERT LYON.

REFERENCES CITED

The following references are of record in the file of this patent:

UNITED STATES PATENTS

| Number | Name | Date |
| --- | --- | --- |
| 1,948,273 | Lyon | Feb. 20, 1934 |
| 1,993,813 | Rosa et al. | Mar. 12, 1935 |
| 2,011,326 | Sinclair | Aug. 13, 1935 |
| 2,123,025 | Ramirez | July 5, 1938 |
| 2,279,334 | Lyon | Apr. 14, 1942 |